United States Patent

Gopinath

Patent Number: 5,805,332
Date of Patent: Sep. 8, 1998

[54] OPTICAL FIBER AMPLIFIER

[75] Inventor: Anand Gopinath, Wayzata, Minn.

[73] Assignee: Regents of the University of Minnesota, Minneapolis, Minn.

[21] Appl. No.: 800,543

[22] Filed: Feb. 18, 1997

[51] Int. Cl.⁶ .................. H01S 3/06; G02B 6/00
[52] U.S. Cl. .................. 359/341; 359/109; 359/195; 359/343; 372/6
[58] Field of Search .................. 359/109, 195, 359/341–3; 385/123, 124; 372/6

[56] References Cited

U.S. PATENT DOCUMENTS

| | | | |
|---|---|---|---|
| 4,114,980 | 9/1978 | Asam et al. | 359/343 |
| 4,871,230 | 10/1989 | Yamashita et al. | 359/341 |
| 4,974,932 | 12/1990 | Nattermann et al. | 359/341 |
| 5,114,738 | 5/1992 | Savage et al. | 359/343 |
| 5,491,767 | 2/1996 | McPherson et al. | 385/123 |
| 5,537,505 | 7/1996 | Borrelli et al. | 372/6 |

FOREIGN PATENT DOCUMENTS 1185702  8/1986  Japan .

OTHER PUBLICATIONS

Payne et al, Proc. of SPIE, vol. 1171, pp. 82–92 1990.

Naslian et al, Jour. Mater. Science, vol. 31, #23, pp. 6263–6267, Dec. 1, 1996; abst only herewith.

Cognalato et al, Proc. of SPIE, vol. 1579, pp. 249–256, 1991; abst only herewith.

Reisfeld et al, Jour. of Solid State Chem., vol. 48, #3, pp. 323–332, Jul. 15, 1983; abst. only herewith.

*Primary Examiner*—Nelson Moskowitz
*Attorney, Agent, or Firm*—Westman, Champlin & Kelly, P.A.

[57] ABSTRACT

The present invention includes an optical fiber amplifier having a core and cladding layer. The core includes Zirconium dioxide ($ZrO_2$) and a rare earth material. The core may be co-deposited with $SiO_2$. A co-dopant of Ytterbium (Yb) may also be used. The optical fiber amplifier is well suited for use in the 1300 nm band when pumped with an optical source of appropriate power and frequency.

12 Claims, 3 Drawing Sheets

OPTICAL FIBER AMPLIFIER

BACKGROUND OF THE INVENTION

The present invention relates to optical fibers for carrying optical signals. More specifically, the invention relates to solid state optical fiber amplifiers which provide amplification to optical signals carried therein.

Optical fibers and waveguides are known in the art and are used to carry optical signals along a desired path. One type of optical waveguide includes a thin film of material deposited upon a substrate. The material has shape and optical characteristics to form a waveguide path along the substrate. Some types of optical waveguides may also provide amplification to the optical signals carried therein. In general, waveguide optical amplifiers are pumped with an external coherent light source (i.e., a laser) to cause ions to enter higher energy bands. Once in the higher energy band, the transition to a lower band is such that the optical signal passing therethrough is amplified.

Similarly, optical fibers carry optical signals along a desired path and typically comprise one or more strands of optically transparent material. Such fibers are more versatile than waveguides which are carried on a fixed substrate. Optical fiber amplifiers are optical fibers that are capable of amplifying the optical signals they carry. Such fiber amplifiers are desirable because they can be easily integrated into an optical fiber system. However, gains of such amplifiers have typically been low.

Optical fibers and optical fiber amplifiers are becoming increasingly important as the communication industry struggles to meet ever-increasing bandwidth requirements. Such optical communication systems must provide a wide bandwidth and be capable of carrying signals over long distances. In particular, when transmitted over long distances the optical signal must be amplified, without significant bandwidth limitation or distortion.

Erbium (Er) doped optical fiber amplifiers have had a large impact on incoherent optical communication systems in the 1550 nm wavelength band. However, such amplifiers provide a relatively low gain per meter of fiber and therefore require a long fiber length to obtain sufficiently large amplification. Furthermore, in the 1300 nm wavelength band, the lasing transition of Praseodymium (Pr) ions $^1G_4 \rightarrow {}^3H_5$ has been found to be the most suitable for use in optical amplification. However, due to the high phonon energies in silica glass fibers, the probability of multiphonon damping is very high. Thus, Pr doped ZBLAN (B) glass fiber, which is a ZrF based material having relatively low phonon energies, is currently the most common amplifier in use for the 1300 nm wavelength band. However, such a Pr doped fluoride glass fiber amplifier has a number of problems. First, the efficiency of the amplifier is relatively low and thus requires high power pump signals. Additionally, the fiber amplifier cannot be easily spliced to conventional silica fiber optical cabling. Finally, the material devitrifies, which results in degradation to the amplifier.

In general, affordable semiconductor amplifiers for either the 1300 nm wavelength band or the 1500 nm wavelength band have high spontaneous emission noise and therefore yield high noise figures. Most single mode optical fiber currently in place was designed to have very low dispersion at 1300 nm. Thus the need for a low cost, high performance and low noise optical amplifier is great, particularly at 1300 nm. This frequency band is used not only by long distance telephone companies but also by cable television companies. Various attempts have been made to provide such amplifiers. Erbium doped dielectric waveguides have been made in a variety of materials and are generally used in the 1550 nm wavelength band. LiNbO$_3$ has become the most prominent of these materials due to its properties. However, such amplifiers have a relatively low gain, only about 13 dB for a 70 mm structure. Thus, there is an ongoing need for a cost effective high performance optical amplifier which introduces little noise into the communication signal.

SUMMARY OF THE INVENTION

The present invention includes an optical fiber amplifier. The optical fiber amplifier includes a core which is carried within a cladding layer. One aspect of the invention includes a core containing Zirconium dioxide ($ZrO_2$). Various embodiments of the invention include a Zirconium dioxide ($ZrO_2$) core containing Silicon dioxide ($SiO_2$) and/or Alumina ($Al_2O_3$). The core material is preferably doped with a rare earth material. Such materials include Praseodymium (Pr) and Erbium (Er). In one embodiment, the core is co-doped with Ytterbium (Yb).

An optical pumping source is provided which is optically coupled to the optical fiber amplifier wherein signals carried within the optical fiber are amplified over a distance of the optical fiber.

DETAILED DESCRIPTION OF THE PREFERRED EMBODIMENTS

Figure 1:
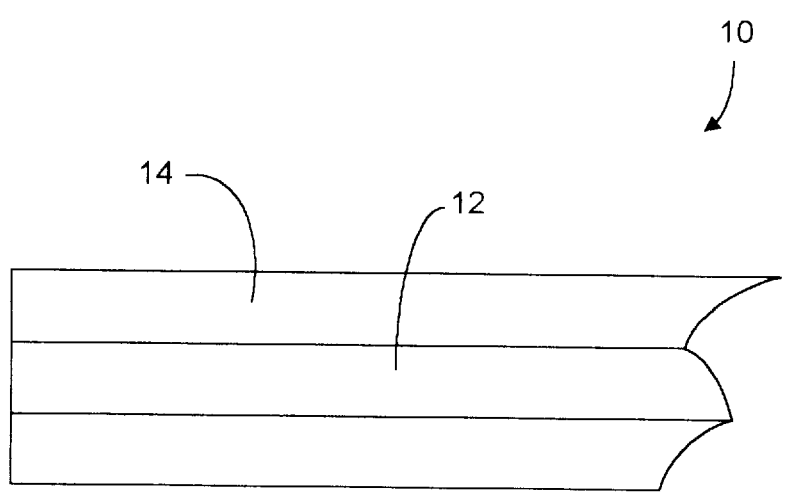
FIG. 1 is a cross-sectional side view of an optical fiber amplifier in accordance with the present invention.

FIG. 1 is a cross-sectional side view of an optical fiber amplifier 10 in accordance with one embodiment of the present invention. Optical fiber amplifier 10 includes core 12 and cladding 14. Typically, cladding material 14 comprises $SiO_2$. In accordance with the present invention, core 12 includes Zirconium dioxide ($ZrO_2$) and Silicon dioxide ($SiO_2$) doped with a rare earth material, preferably Praseodymium (Pr).

Core 12 has an index of refraction which is greater than the index of refraction of the surrounding cladding material 14. In general, there are three basic types of optical fibers. These are multi-mode, stepped refractive index profile fibers which are typically used for conventional image transfer and short distance data transmission. In a multi-mode fiber, multiple modes of light are guided through the fiber in a manner which is determined by the core size and the difference in refractive index between the core and the cladding. Such a multi-mode fiber causes a light pulse to spread as it travels down the fiber because different modes of transmission follow paths which have differing lengths. A second type of fiber is a guided index multi-mode fiber in which the core refractive index decreases with increased radial distance. This technique tends to minimize pulse broadening due to mode dispersion because light rays travel more slowly near the core center than near the core edges. Finally, a single mode fiber has a low refractive index difference between the core and the cladding and has a relatively small core size. This eliminates mode and pulse dispersion and is well suited for long distance, high speed data transmission.

Figure 2:
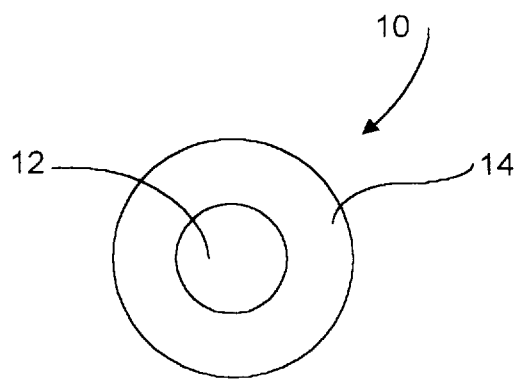
FIG. 2 is a cross-sectional end view of the optical fiber of FIG. 1.
Figure 3:
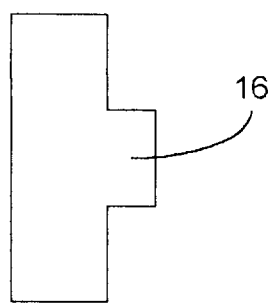
FIG. 3 is a profile of the index of refraction of the optical fiber of FIG. 1.

Optical fiber 10 shown in FIGS. 1 and 2 is a single mode type optical fiber. However, the present invention is applicable to other types of fibers. FIG. 3 shows a side profile of the index of refraction of fiber 10. Peak 16 is due to core 12.

The present invention includes an optical fiber core of material which provides for optical amplification when the fiber is pumped with an optical source of appropriate frequency and power. In operation, the Praseodymium (Pr) carried in core 12 is such that ions are maintained at higher energy levels. The optical pumping induces the Praseodymium (Pr) ions to transition from a lower energy level to a higher energy level. Subsequently, the passage of a second stimulating optical or beam signal (i.e. the communication signal carried through fiber 10), causes ions to drop to lower energy levels thereby resulting in the stimulated emission of photons. The photons are added to the optical signal carried in fiber 10, thus causing signal amplification. For efficient operation, the pumping signal must be of an appropriate wavelength and energy level to cause atoms of the Praseodymium (Pr) to be pumped to higher energy levels.

In a preferred embodiment, core 12 includes $ZrO_2$ and $SiO_2$ doped with Pr. Typically, the ratio in the index of refraction between core 12 and cladding 14 should be selected to be about $10^{-3}$. However, this may be selected as desired. Further, the index of refraction may be adjusted as appropriate and may be selected to closely match existing optical fiber. The $ZrO_2$ tends to prevent or reduce phonon quenching in the Pr dopant. In some embodiments, it may also be desirable to provide a graded core. In applications where amplification is sufficiently large and is provided over a relatively short distance, even relatively large differences between the index of refractions of the cladding and core may be utilized.

Additionally, in the present invention, core 12 includes Silicon dioxide ($SiO_2$) which acts to prevent or reduce microcrystallinity of the $ZrO_2$. In general, the core should be amorphous. Additionally, Alumina ($Al_2O_3$) may be included in core 12 which acts to reduce clustering effects. A typical diameter of core 12 is about 9 $\mu$m. Fiber optical amplifier 10 is well suited for transmission and amplification of signals in the 1300 nm band. Preferably, when the core is doped with Pr, the optical pumping source provides an output having a wavelength of about 1017 nm. However, in one embodiment of the invention, core 12 is co-doped with Ytterbium (Yb) in which case a optical pumping source at 980 nm may be used. Further, in one embodiment the rare earth dopant is Erbium (Er) and the amplifier is pumped at a wavelength of about 1049 nm or about 980 nm when co-doped with Ytterbium (Yb). In various preferred embodiments, a concentration of at least about 10% $SiO_2$ is used with the $ZrO_2$. $Al_2O_3$ may be co-deposited therewith between about 0% and 10% of the total material to reduce clustering effects.

Figure 4:
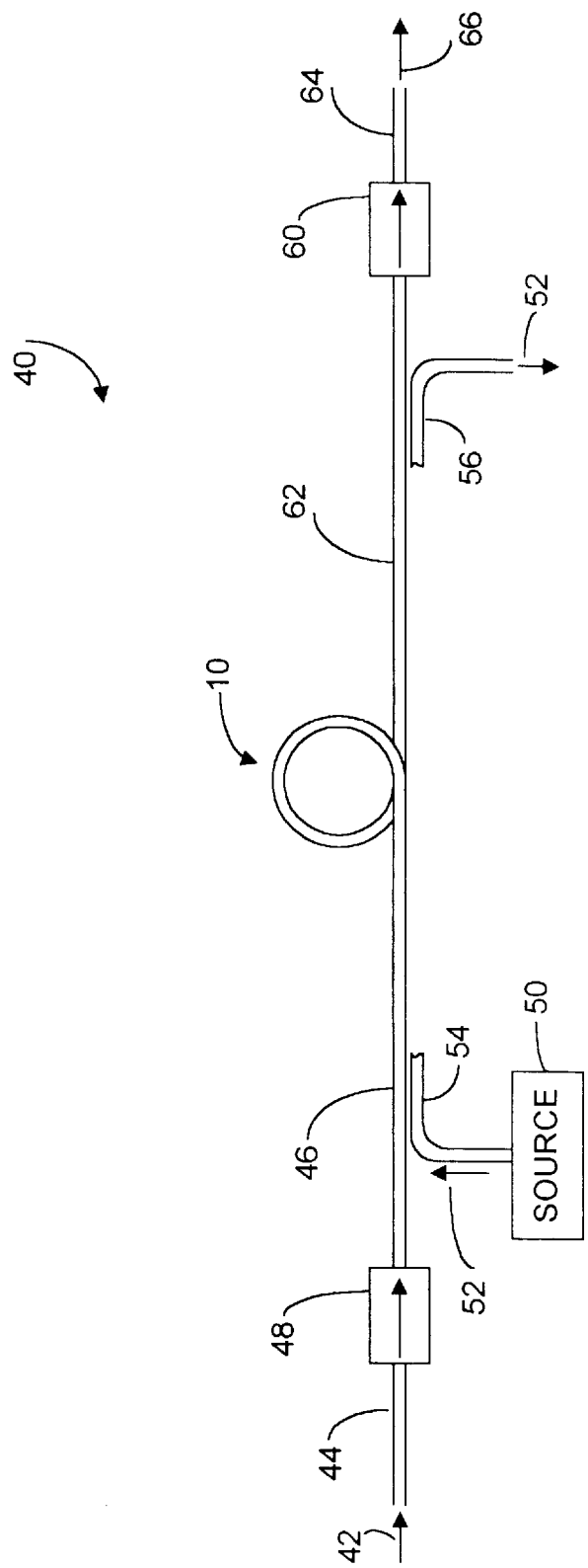
FIG. 4 is a simplified diagram of a system using a fiber optical amplifier in accordance with the invention.

FIG. 4 is a simplified diagram showing amplification system 40 which uses optical fiber amplifier 10 in accordance with the invention. System 40 receives input signal 42 through optical fiber 44 which couples to optical fiber 46 through optical isolator 48. Fiber 46 couples to optical fiber amplifier 10 and may, if indexes of refraction are sufficiently different, provide a matching region between the two fibers. Optical isolator 48 prevents any reflections from being propagated back through fiber 44. An optical pumping source 50 generates an excitation pump signal 52 of desired strength and frequency which is coupled into fiber 46 (and thereby amplifier 10 through) optical multiplexer 54. As explained above, the excitation pump signal 52 causes amplification of input signal 42 as it passes through optical amplifier 10. Excitation pump signal 52 exists system 40 through optical demultiplexer 56. Optical amplifier 10 couples to optical isolator 60 through optical fiber 62 which may also be used for matching to optical fiber 64. Optical fiber 64 provides amplified output signal 66. System 40 is merely one example and other types of systems may be employed using optical amplifier 10. Further, the excitation pump signal 52 may be coupled into optical fiber amplifier 10 in accordance with any technique.

The present invention may be fabricated using standard optical fiber fabrication techniques. For example, first a cylindrical preform is made having the desired refractive index profile. Typically, the preform is 1 m long with a diameter of about 2 cm. Three common techniques are used to make preforms, these include modified chemical vapor deposition, outside vapor deposition and vapor axial deposition. Modified chemical vapor deposition is most often employed. A preform tube is obtained which is typically a fused silica tube. A sufficiently thick layer of cladding material is deposited on the inside of the preform tube. Successive layers of core material are then deposited along the inside of the tube. In accordance with the present invention, $ZrO_2$ and $SiO_2$ are deposited around the inner radius to form the core, and doped with Pr. After forming the preform, a drawing step is performed in which the preform is heated and pulled through a thin diameter orifice causing the preform to collapse onto itself to thereby form the final optical fiber amplifier.

Although the present invention has been described with reference to preferred embodiments, workers skilled in the art will recognize that changes may be made in form and detail without departing from the spirit and scope of the invention. The invention may be fabricated using any appropriate fabrication technique. Furthermore, the various concentration of materials may be adjusted to obtain the desired characteristics of the amplifier as may be the various dimensions of elements and indexes of refraction. As used herein, "concentration" generally refers to concentration by weight. Further, multiple cores may be used within a single cladding. The invention provides a number of advantages including relatively high gain over short distances. Furthermore, optical fiber amplifiers in accordance with invention may be easily spliced into existing optical fibers and may be designed to closely match the index of refraction of those existing fibers. This reduces the reflection and enhances the signal coupling of the inventive optical fiber amplifier into existing optical fiber systems. Although the core of the present invention has been shown with circular cross sections, other cross sections such as elliptical cross sections, may be used as desired. In various embodiments, the concentration of Pr is less than about 1.0%, the concentration of Er is less than about 1.0%, and the concentration of Yb is less than about 2.0%. Further, in one embodiment the concentration is about 0.1%.

What is claimed is:

1. An optical fiber amplifier, comprising:
    an elongated cladding material having a cladding index of refraction; and
    an elongated core having a core index of refraction which is higher than the cladding index of refraction, the elongated core including Zirconium dioxide ($ZrO_2$) doped with a rare earth material comprising praseodymium (Pr) to thereby provide a peak in luminescence at about 1300 nm in wavelength.

2. The optical fiber amplifier of claim 1 wherein the elongated core further includes Silicon dioxide ($SiO_2$) therein.

3. The optical fiber amplifier of claim 2 wherein the concentration of $SiO_2$ in the elongated core is at least about 10%.

4. The optical fiber amplifier of claim 1 wherein the elongated core further includes Alumina ($Al_2O_3$) therein.

5. The optical fiber amplifier of claim 4 wherein the concentration of $Al_2O_3$ is less than about 10%.

6. The optical fiber amplifier of claim 1 wherein the concentration of Pr in the elongated core is less than about 1.0%.

7. The optical fiber amplifier of claim 1 wherein a ratio in the cladding index of refraction and the core index of refraction is about $10^{-3}$.

8. The optical fiber amplifier of claim 1 wherein a diameter of the core is about 9 μm.

9. The optical fiber amplifier of claim 1 wherein the elongated core is co-doped with Ytterbium (Yb).

10. The optical fiber amplifier of claim 9 wherein the concentration of Yb is less than about 2.0.

11. The optical fiber amplifier of claim 1 including a pump signal source providing a pump signal of about 1017 nm in wavelength.

12. The optical fiber amplifier of claim 9 including a pump signal source providing a pump signal of about 980 nm in wavelength.

* * * * *

UNITED STATES PATENT AND TRADEMARK OFFICE
CERTIFICATE OF CORRECTION

PATENT NO. : 5,805,332
DATED : September 8, 1998
INVENTOR(S) : Anand Gopinath

It is certified that error appears in the above-identified patent and that said Letters Patent is hereby corrected as shown below:

On the title page,
Under [56] References Cited
U.S. PATENT DOCUMENTS

Insert --
| | | | |
|---|---|---|---|
| 4,938,594 | 7/3/90 | Pavlath | 356/350 |
| 5,006,203 | 4/9/91 | Purdes | 156/646 |
| 5,303,319 | 4/12/94 | Ford et al | 385/131 |
| 5,319,727 | 7/7/94 | Ford et al | 385/30 |
| 5,327,282 | 7/5/94 | Takeda et al | 359/341 |
| 5,418,182 | 5/23/95 | Ford | 437/129 |
| 5,438,639 | 8/1/95 | Ford et al | 385/30 |
| 5,453,872 | 9/26/95 | Heidemann et al | 359/341 |
| 5,475,528 | 12/12/95 | LaBorde | 359/341 |
| 5,491,767 | 2/13/96 | McPherson et al | 385/123 |
| 5,500,764 | 3/19/96 | Armitage et al | 359/341 |
| 5,532,870 | 7/2/96 | Shigematsu et al | 359/341 |
| 5,543,237 | 8/6/96 | Watanabe | 428/691 |
| 5,559,912 | 9/24/96 | Agahi et al | 385/42 |
| 5,570,448 | 10/29/96 | Imoto et al | 385/126 |
| 5,579,154 | 11/26/96 | Mueller-Fiedler et al | 359/341 |
| 5,581,397 | 12/3/96 | Maki et al | 359/341 |

--

UNITED STATES PATENT AND TRADEMARK OFFICE
CERTIFICATE OF CORRECTION

PATENT NO. : 5,805,332
DATED : September 8, 1998
INVENTOR(S) : Anand Gopinath

It is certified that error appears in the above-indentified patent and that said Letters Patent is hereby corrected as shown below:

Under OTHER PUBLICATIONS

Insert --

"$Pr^{3+}$-Doped Fluoride Fiber Amplifier Operating at 1.31 $\mu$m," by Y. Ohishi et al., Optical Society of America, Vol. 16, No. 22, November 1991, pgs. 1747-1749.

"Low-Noise and High-Power $Pr^{3+}$-Doped Fluoride Fiber Amplifier," by M. Yamada et al., IEEE Photonics Technology Letters, Vol. 7, No. 8, August 1995, pgs. 869-871. --

Col. 6, line 6, after "2.0" insert --%--.

Signed and Sealed this

Twenty-eighth Day of September, 1999

Attest:

Attesting Officer

Q. TODD DICKINSON

Acting Commissioner of Patents and Trademarks